(12) United States Patent
Dobai

(10) Patent No.: US 12,125,647 B2
(45) Date of Patent: Oct. 22, 2024

(54) METHOD OF MANUFACTURING A POLYMER CAPACITOR AND POLYMER CAPACITOR

(71) Applicant: TDK Electronics AG, Munich (DE)

(72) Inventor: Laszlo Dobai, Szeleste (HU)

(73) Assignee: TDK Electronics AG, Munich (DE)

( * ) Notice: Subject to any disclaimer, the term of this patent is extended or adjusted under 35 U.S.C. 154(b) by 492 days.

(21) Appl. No.: 17/526,614

(22) Filed: Nov. 15, 2021

(65) Prior Publication Data

US 2022/0076896 A1    Mar. 10, 2022

Related U.S. Application Data

(62) Division of application No. 16/630,544, filed as application No. PCT/EP2018/070166 on Jul. 25, 2018, now Pat. No. 11,282,650.

(30) Foreign Application Priority Data

Jul. 28, 2017 (DE) .......................... 102017117160.6

(51) Int. Cl.
*H01G 9/15* (2006.01)
*H01G 9/00* (2006.01)
*H01G 9/028* (2006.01)
*H01G 9/035* (2006.01)

(52) U.S. Cl.
CPC .......... *H01G 9/151* (2013.01); *H01G 9/0029* (2013.01); *H01G 9/0036* (2013.01); *H01G 9/028* (2013.01); *H01G 9/035* (2013.01)

(58) Field of Classification Search
CPC .... H01G 9/035; H01G 9/0036; H01G 9/0029; H01G 9/028; H01G 9/151
See application file for complete search history.

(56) References Cited

U.S. PATENT DOCUMENTS

| | | | |
|---|---|---|---|
| 7,497,879 B2 | 3/2009 | Kakuma et al. | |
| 9,589,738 B2 | 3/2017 | Sugihara et al. | |
| 10,115,529 B2 | 10/2018 | Koseki et al. | |
| 2004/0240156 A1 | 12/2004 | Norton et al. | |
| 2008/0204974 A1* | 8/2008 | Yoshimitsu | H01G 9/151 29/25.03 |
| 2010/0135937 A1 | 6/2010 | O'Brien et al. | |
| 2014/0102884 A1 | 4/2014 | Miller | |
| 2014/0106235 A1 | 4/2014 | Yamada et al. | |
| 2014/0120424 A1 | 5/2014 | Yamada et al. | |
| 2014/0334066 A1 | 11/2014 | Sugihara et al. | |
| 2016/0240323 A1* | 8/2016 | Chacko | H01G 11/04 |

(Continued)

FOREIGN PATENT DOCUMENTS

| | | |
|---|---|---|
| CN | 1624952 A | 6/2005 |
| CN | 103620816 A | 3/2014 |
| CN | 104040658 A | 9/2014 |

(Continued)

*Primary Examiner* — David M Sinclair
(74) *Attorney, Agent, or Firm* — Slater Matsil, LLP

(57) ABSTRACT

A method for manufacturing a polymer capacitor and a polymer capacitor are disclosed. In an embodiment a polymer capacitor includes an anode foil, a cathode foil and separator foils wound to a winding, wherein the anode foil is covered by a polymer, wherein one or more additives are distributed in the polymer, and wherein at least one of the additives has a boiling point below 130° C.

20 Claims, 2 Drawing Sheets

(56) References Cited

U.S. PATENT DOCUMENTS

2016/0336117 A1 11/2016 Koseki et al.
2017/0148575 A1 5/2017 Tsubaki et al.

FOREIGN PATENT DOCUMENTS

| CN | 105406146 A | | 3/2016 |
|----|----|----|----|
| CN | 105793940 A | | 7/2016 |
| CN | 106575578 A | | 4/2017 |
| JP | 11186110 A | * | 7/1999 |
| JP | 2009215424 A | | 9/2009 |
| JP | 2012074436 A | * | 4/2012 |
| JP | 2012243856 A | * | 12/2012 |
| JP | 2016009770 A | | 1/2016 |
| WO | 2016031207 A1 | | 3/2016 |

* cited by examiner

METHOD OF MANUFACTURING A POLYMER CAPACITOR AND POLYMER CAPACITOR

CROSS-REFERENCE TO RELATED APPLICATIONS

This is a divisional application of U.S. application Ser. No. 16/630,544, entitled "Method of Manufacturing a Polymer Capacitor and Polymer Capacitor," which was filed on Jan. 13, 2020, which is a national phase filing under section 371 of PCT/EP2018/070166, filed Jul. 25, 2018, which claims the priority of German Patent Application 10 2017 117 160.6, filed Jul. 28, 2017, each of which is incorporated herein by reference in its entirety.

TECHNICAL FIELD

The present invention relates to a method of manufacturing a polymer capacitor and to a polymer capacitor. In particular, the capacitor may be a hybrid polymer capacitor comprising a solid polymer electrolyte and a liquid electrolyte.

SUMMARY

Such a capacitor usually comprises an anode foil, a cathode foil and separator foils in between, wound to a winding. The anode foil is covered by a dielectric layer. The polymer covers the anode foil, in particular the dielectric layer of the anode foil, and acts as a cathode. The polymer is applied by impregnating the winding with a dispersion containing a solvent, a polymer precursor and optionally additives.

In standard methods as described in U.S. Pat. No. 7,497,879 B2, the dispersion is applied by impregnation and, thereafter, the solvent is removed by evaporation in vacuum and/or at high temperatures. These conditions may lead to a degradation of the foils and may lead to unwanted reduction of the amount of additives.

Embodiments provide an improved method of manufacturing a polymer capacitor. Further embodiments provide a polymer capacitor having improved properties.

Various embodiments provide a method of manufacturing a polymer capacitor. The polymer capacitor may be a hybrid polymer capacitor comprising a polymer forming a solid electrolyte and further comprising a liquid electrolyte. The separator foils may be impregnated with the liquid electrolyte.

The method comprises winding an anode foil, a cathode foil and separator foils to form a winding, impregnating the winding with a dispersion comprising a solvent and a polymer precursor and extracting the solvent from the winding in a supercritical fluid extraction process.

In particular, the polymer precursors are particles forming a polymerized polymer after removal of the solvent. The polymer is conductive. The dispersion may comprise one or more additives. The additives may be used for increasing the conductivity of the polymer and, thereby, for reducing the ESR (equivalent series resistance) of the capacitor. Additives may alternatively or additionally added to the winding element in other ways than by the dispersion. As an example, one or more additives may be added to the foils before winding the foils into the winding element.

In the supercritical fluid extraction process, a fluid in its supercritical phase is used for extracting the solvent. As examples, carbon dioxide or nitrous oxide may be used as the fluid. The winding is stored in an extraction cell, in which the fluid is introduced. The temperature and pressure in the extraction cell are set such that the supercritical phase of the fluid is achieved.

Within the temperature-pressure region of the supercritical phase of the liquid, the temperature and pressure can be adjusted such that the solvent is selectively extracted from the winding. In particular, other components of the dispersion may be not or only to a small amount extracted from the winding in the supercritical fluid extraction process. This enables retaining additives, which may be contained in the initial dispersion or may be added by other methods to the winding element, at a high amount or even at the initial amount during the extraction process. In particular, additives having a low boiling point can be retained in the winding.

The supercritical fluid extraction process may be carried out at a low process temperature, e.g., below 60° C. Thereby, damage of the winding due to high temperature can be prevented. In a conventional evaporation process the solvent evaporates as steam, which may lead to damage of the winding, for example by oxide and hydroxide generation on the foils. This may lead to a reduction of life time and reduced electrical performance.

The supercritical fluid extraction process may be carried out at a pressure above 1 atm. In contrast to that, conventional evaporation processes are often carried out at low pressure or vacuum conditions which may lead to unwanted removal of additives. By carrying out the process at a pressure above 1 atm additives can be retained in the winding and damage of the winding is prevented.

In an embodiment, one or more additives in the dispersion may have a low boiling point. In particular, the boiling point may be below 130° C. The additive may comprise a single component, for example. In some embodiments, the additive may comprise an azeotropic mixture of at least two components. An azeotropic mixture has a characteristic boiling point, which may be different from the boiling points of its individual components. In this case, the azeotropic mixture may have a low boiling point, in particular below 130° C.

The supercritical fluid extraction process enables retaining these low boiling point additives in the winding during the extraction process. Accordingly, low boiling point additives can be used for improving the characteristics of the winding and, in particular, the characteristics of the polymer. In a standard evaporation process, such low boiling point additives will be removed during the process.

Using the supercritical fluid extraction process generally enables retaining the additives, which may be low boiling point additives and/or higher boiling point additives, at a high amount in the winding. In particular, the additive may remain in the winding at least in an amount of 80% of the initial amount, i.e. in the amount before extracting the solvent. This may be the initial amount in the dispersion or in the winding element before the extraction step. In other embodiments, the additive may remain in a lower amount in the winding, for example in an amount of 50% to 75%. Depending on the process parameters, the amount may be between 1% and 30%, for example.

In one embodiment, at least one of the additives may have a higher boiling point, e.g., a boiling point above 130° C.

Additives having a low boiling point may consist or comprise a short or middle chain alky alcohol, a low molecular weight ester, ethyl acetate or propyl acetate. Short or middle chain alkyl alcohols include butyl alcohol, isopropyl alcohol, unsaturated alcohols like allyl alcohol and brand chain alcohols (t-butyl alcohols), for example. Additives having a higher boiling point may consist or comprise specific salts and polymers, for example. In particular, such additives may consist or comprise polyols, polyalkylene glycol(s), for example mannitol, sorbitol, xylitol and polyethylene glycol(s) such as PEG300-PEG2000.

Embodiments further provide a polymer capacitor manufactured by the method described above. In particular, the polymer capacitor may be a hybrid polymer capacitor comprising a polymer and a liquid electrolyte. Due to the supercritical fluid extraction process, the polymer capacitor may comprise additives which are not present in comparable capacitors manufactured by a standard evaporation process.

According to further embodiments a polymer capacitor comprises an anode foil, a cathode foil and separator foils wound to a winding. The polymer covers at least the anode foil. The polymer may be located also on the cathode foil or the separator foils. The capacitor may be a hybrid polymer capacitor.

One or more additives are distributed in the polymer. The additives may be initially contained in a dispersion comprising a solvent and a polymer precursor. At least one of the additives may have a boiling point below 130° C. The capacitor may be manufactured by the above disclosed method. The capacitor and, in particular, the additives may have the characteristics as described in connection with the disclosed method.

In particular, at least one of the additives may consist of or comprise a short or middle chain alkyl alcohol, a low molecular weight ester, ethyl acetate or propyl acetate.

Additionally or alternatively to low boiling point additives, the capacitor may comprise one or more additives having a higher boiling point. The additives may be present in a high amount.

As an example, the weight of at least one of the additives having a low boiling point is at least 0.2% of the dry weight of the winding. In some embodiments, the weight may be at least 30% of the dry weight of the winding. The dry weight of the winding is the weight of the winding before addition of any kind of dispersion, additives and liquid electrolyte.

The weight of at least one of the additives having a low boiling point may be at least the same as the weight of the polymer. In some embodiments, the weight may be up to or more than 15 times the weight of the polymer.

Additionally or alternatively, the surface area of at least one of the additives having a low boiling point may be at least 25% of the surface area of the anode foil. In some embodiments, the relative surface area may be at least 50%.

High boiling point additives may be present at a weight of at least 2% of the dry weight of the winding. In some embodiments, the weight may be up to or more than 30% of the dry weight of the winding.

Every feature described with respect to the method and the capacitors is also disclosed herein with respect to the other aspect, even if the respective feature is not explicitly mentioned in the context of the specific aspect.

BRIEF DESCRIPTION OF THE DRAWINGS

Further features, refinements and expediencies become apparent from the following description of the exemplary embodiments in connection with the figures.

DETAILED DESCRIPTION OF ILLUSTRATIVE EMBODIMENTS

Figure 1:
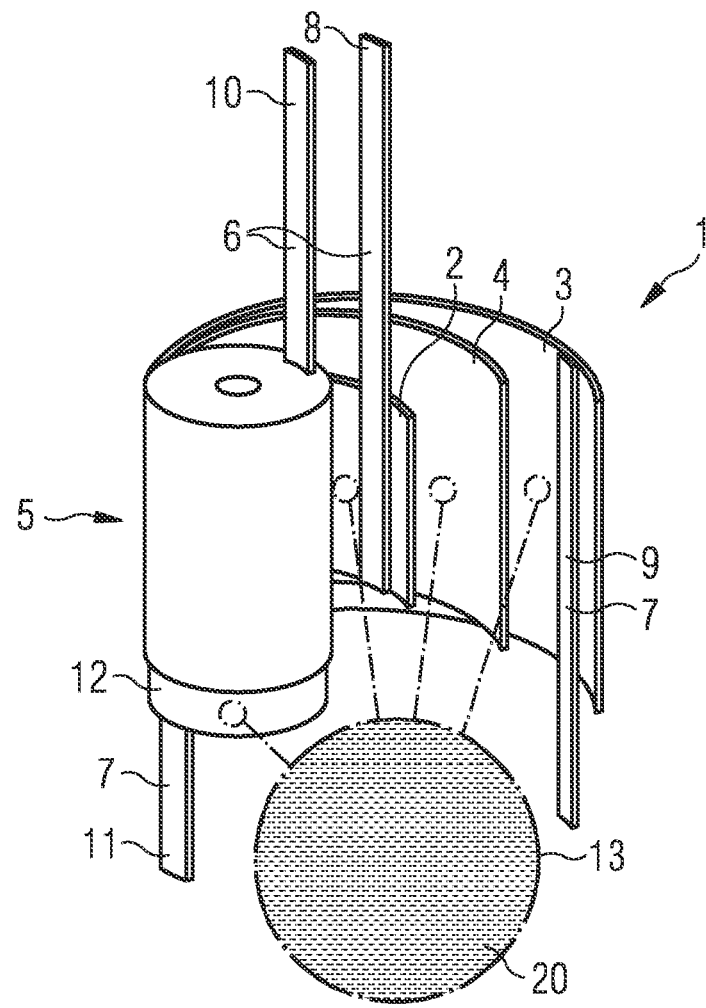
FIG. 1 schematically shows the structure of a polymer capacitor.

FIG. 1 shows a polymer capacitor 1 in a partially unwound view. The capacitor 1 comprises an anode foil 2, a cathode foil 3 and separator foils 4 in between. In this figure, only one separator foil 4 is shown. A further separator foil is present between the cathode foil 3 and the anode foil 2 at the other side of the foils 2, 3. The foils 2, 3, 4 are wound around a common axis into a winding 5.

The winding 5 may be located in a can (not shown in the figure). The can may comprise a metal such as aluminum.

The anode foil 2 is electrically contacted by a first contact structure 6. The cathode foil 3 is electrically contacted by a second contact structure 7. Each of the contact structures 6, 7 may comprise multiple stacked contact elements 8, 9. The contact structures 6, 7 and the multiple contact elements 8, 9 may have the shapes of tabs. The contact elements 8, 9 extend to opposite sides of the winding 5. In particular, the first contact structure 6 may have a lead-out 10 extending upwards and the second contact structure 7 may have a second lead-out 11 extending downwards. Furthermore, the contact structures 6, 7 are located at opposite lateral sides of the winding 5. By using multiple first contact elements 8 forming a first contact structure 6 and multiple second contact elements 9 forming a second contact structure 7 the metal resistance of the winding 5 can be reduced. Thereby, the ESR of the capacitor 1 is reduced.

Alternatively, each of the contact structures 6, 7 may be formed by a single contact element 8, 9.

The cathode foil 3 may have an extension 12 in an axial direction of the winding 5. In particular, the cathode foil 3 may extend axially beyond the anode foil 2. The extension 12 may be electrically and also mechanically connected to a bottom of a can. Additionally or alternatively, the anode foil 2 may have an extension 12 in an axial direction, e.g., in the opposite axial direction.

The anode foil 2 may comprise an aluminum foil covered by a dielectric layer, in particular an oxide layer. Also the cathode foil 3 may comprise an aluminum foil covered by an oxide layer. The separator foil 4 may be formed by a paper material.

The anode foil 2, in particular the dielectric layer formed on the anode foil 2, is covered by a polymer 13. The polymer 13 is conductive and serves as a solid electrolyte. The polymer 13 may also be disposed on the cathode foil 3 and the separator foil 4. The polymer 13 may be applied by impregnating the winding 5 with a dispersion containing a solvent, a polymer precursor and one or more additives 20. After that, the solvent is extracted and the polymer precursor polymerizes to form the polymer 13. The additives 20 are distributed in the polymerized polymer 13.

The function of the additives 20 may be to improve the inter-connection of the polymer 13, e.g., between polymer particles. As an example, the additives 20 may strengthen secondary chemical bonds and intermolecular connections. Thereby, the conductivity of the polymer 13 can be reduced, whereby the ESR of the capacitor 1 is reduced.

As an example, the weight of at least one of the low boiling point additives 20 may be at least the same as the weight of the polymer 13.

The additives 20 may comprise or consist of a material having a low boiling point, e.g., short or middle chain alkyl alcohols, low molecular weight ester (<200 g/mol), ethyl acetate or propyl acetate. Short or middle chain alkyl alcohols include butyl alcohol, isopropyl alcohol, unsaturated alcohols like allyl alcohol and brand chain alcohols (t-butyl alcohols), for example.

The additive 20 may comprise an azeotropic mixture of at least two components. An azeotropic mixture cannot be separated into its components by distillation. An azeotropic mixture has a characteristic boiling point, which may be different from the boiling points of its individual components.

In addition to that, at least one of the additives 20 may comprise or consist of a material having a high boiling point, such as specific salts or polymers.

Additionally, the winding 5 may be impregnated with a liquid electrolyte. The separator foil 4, in particular, may be impregnated with the liquid electrolyte. In this case, the polymer capacitor 1 is a hybrid polymer capacitor.

The capacitor 1 can be manufactured by the process described in the following.

Figure 2:
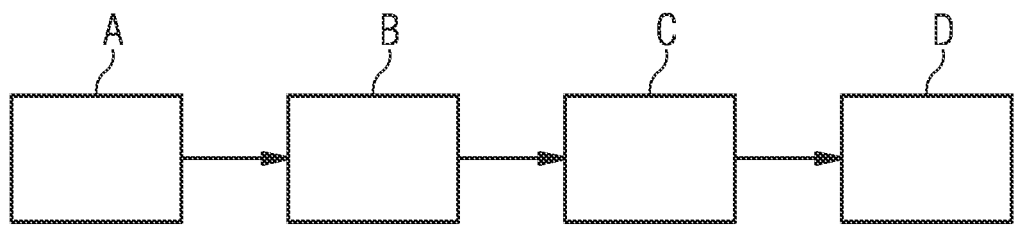
FIG. 2 shows steps in a method of fabricating a polymer capacitor.

FIG. 2 shows a flow diagram of a method of manufacturing a polymer capacitor, such as the capacitor 1 shown in FIG. 1.

In step A, an anode foil 2, a cathode foil 3 and separator foils 4 are prepared and wound into a winding 5. Prior to forming the winding 5, one or more first contact elements 8 may be attached to the anode foil 2 and one or more second contact elements 9 may be attached to the cathode foil 3.

Then, in step B, the winding 5 is impregnated with a dispersion comprising a solvent and a polymer precursor. The dispersion may also comprise one or more additives 20. The solvent may comprise water or may mainly consist of water.

After that, in step C, the solvent is extracted and, thereby, partially or completely removed. The removal of the solvent enables the polymerization of the polymer precursor and the inter-connection of the polymer 13. The extraction of the solvent is accomplished by using a supercritical fluid extraction process, in which a supercritical fluid is used for extracting the solvent.

As an example, a fluid like carbon dioxide ($CO_2$) or nitrous oxide ($N_2O$) is brought in its supercritical state.

Figure 3:
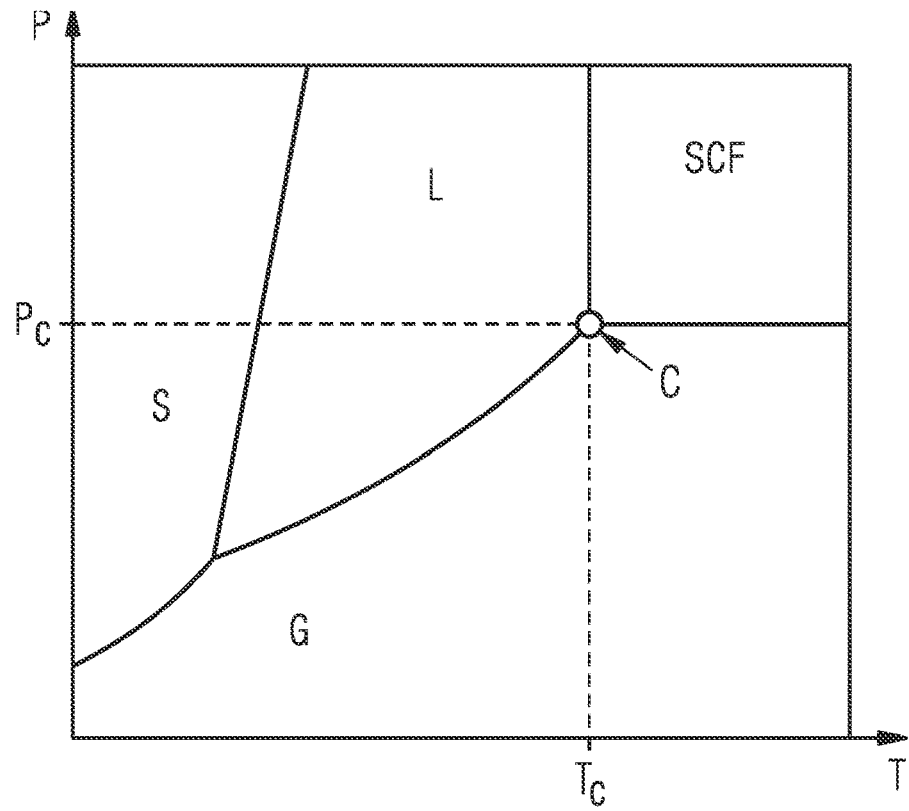
FIG. 3 shows a pressure-temperature phase diagram.

FIG. 3 shows a pressure-temperature phase diagram depicting a solid phase S, a gas phase G, a liquid phase L and a supercritical fluid phase SCF. By setting the temperature T and pressure P above a critical temperature $T_C$ and critical pressure $P_C$, a critical point C is exceeded and the fluid is brought in its supercritical state. As an example, the critical temperature $T_C$ for $CO_2$ is 31° C. and the critical pressure $P_C$ is 74 bar.

The supercritical fluid extraction process enables removing the solvent at low temperatures, e.g., temperatures below 60° C. Additionally, the supercritical fluid extraction process enables removing the solvent without setting vacuum conditions (<1 atm). Furthermore, adjusting the temperature T and pressure P within the supercritical region to specific values enables selectively extracting the solvent without extracting the additives 20 at the same time.

This process enables using additives 20 in the polymer dispersion which have low boiling points, whereby the additives 20 remain in the winding 5 during the extraction process. As an example, a low boiling point additive 20 may have a boiling point below 130° C.

Furthermore, the low process temperature prevents damage of the anode and cathode foils 2, 3 by high temperature water, in particular steam, which may be produced in conventional evaporation methods and may lead to a degradation of the foils 2, 3. Such a damage may lead to a change of capacitance and stability of the anode and cathode foils 2, 3 and to a reduction of life time and electrical performance of the capacitor 1. The supercritical fluid extraction enables preserving the anode and cathode foils 2, 3 in their states, which ensures a high life time and good electrical performance of the capacitor 1.

Furthermore, the supercritical fluid extraction enables maintaining the amount of additives 20 at the initial level or at a only slightly reduced level. Accordingly, the resulting capacitor 1 may comprise a high amount of additives 20, thereby maximizing the conductivity of the polymer 13 and reducing the ESR of the capacitor 1. In contrast to that, conventional evaporation methods will result in huge losses of the amount of additives due to high temperature and/or vacuum.

Returning to FIG. 2, after conducting the supercritical fluid extraction process, step D may be carried out, wherein step D comprises impregnating the winding 5 with a liquid electrolyte and final assembly of the capacitor 1.

Figure 4:
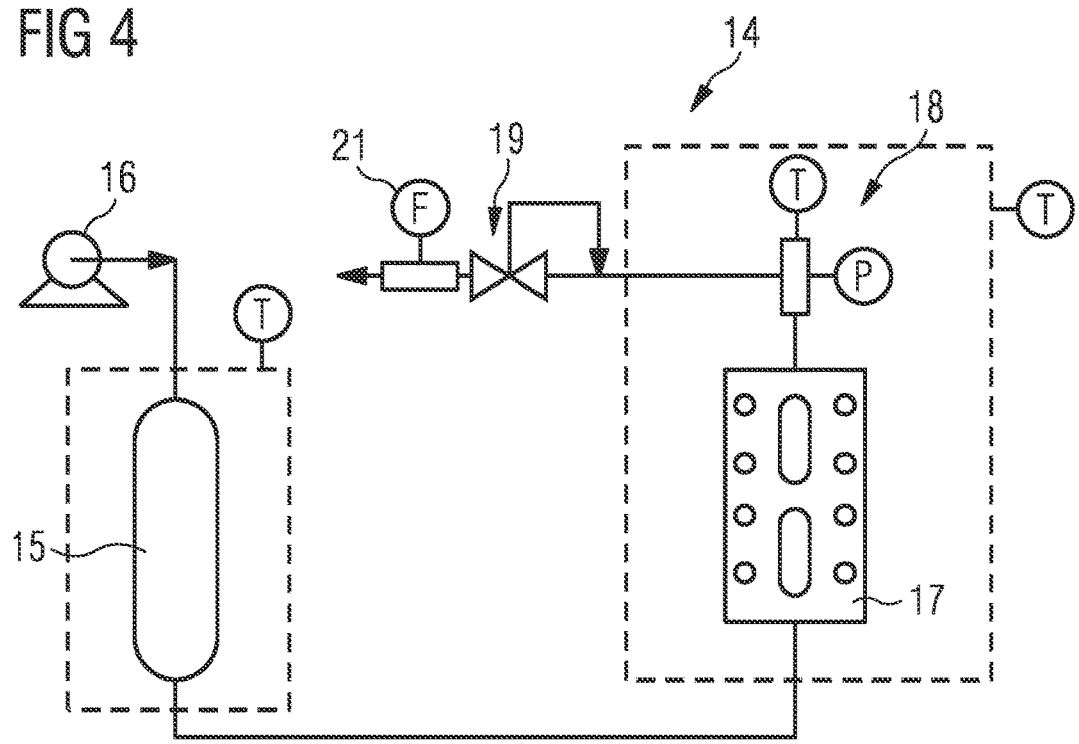
FIG. 4 schematically shows a device for carrying out a supercritical fluid extraction process.

FIG. 4 shows an exemplary device 14 for carrying out the supercritical fluid extraction process in the method described in FIG. 2.

The device 14 comprises a storage tank 15, in which a fluid is stored. The fluid may be in its gas phase. The fluid may be $CO_2$ or $N_2O$, for example. The fluid is compressed by a compressor 16 and pumped into an extraction cell 17, in which the winding 5 impregnated with the dispersion is stored.

By a T-P control unit 18, the temperature T in the extraction cell 17 is set to a temperature larger than the critical temperature $T_C$ of the fluid. The pressure P in the extraction cell 17 is set to a pressure larger than the critical pressure $P_C$ of the fluid. The pressure P may be regulated by a backpressure regulator 19 to ensure that the optimum pressure is set. In particular, the pressure and temperature is set such that the fluid is in its supercritical state and that water is selectively extracted from the impregnated winding 5. The outflow of the extracted solvent and the fluid is controlled by a flow meter 21.

The invention claimed is:

1. A polymer capacitor comprising:
an anode foil;
a cathode foil; and
separator foils wound to a winding,
wherein the anode foil is covered by a polymer,
wherein one or more additives are distributed in the polymer,
wherein at least one of the additives has a boiling point below 130° C., and
wherein a weight of the at least one of the additives is at least the same as a weight of the polymer.

2. The polymer capacitor according to claim 1, wherein the at least one of the additives comprises a short or middle chain alkyl alcohol, a low molecular weight ester, an ethyl acetate or propyl acetate.

3. The polymer capacitor according to claim 1, wherein the at least one of the additives comprises a short or middle chain alkyl alcohol in form of a butyl alcohol, an isopropyl alcohol or an unsaturated alcohol.

4. The polymer capacitor according to claim 1, wherein the at least one of the additives comprises a low molecular weight ester having a molecular weight smaller than 200 g/mol.

5. The polymer capacitor according to claim 1, wherein a surface area of the at least one of the additives is at least 25% of a surface area of the anode foil.

6. The polymer capacitor according to claim 1, further comprising a liquid electrolyte.

7. The polymer capacitor according to claim 1, wherein the polymer is a solid polymer.

8. The polymer capacitor according to claim 1, wherein the polymer capacitor is a hybrid polymer capacitor comprising the polymer and a liquid electrolyte.

9. The polymer capacitor according to claim 1, wherein the at least one of the additives increases a conductivity of the polymer.

10. The polymer capacitor according to claim 1, wherein the polymer capacitor is free of a solvent.

11. The polymer capacitor according to claim 1, wherein the polymer capacitor is free of water as a solvent.

12. A polymer capacitor comprising:
an anode foil;
a cathode foil; and
separator foils wound to a winding,
wherein the anode foil is covered by a polymer,
wherein one or more additives are distributed in the polymer,
wherein at least one of the additives has a boiling point below 130° C., and
wherein a surface area of the at least one of the additives is at least 25% of a surface area of the anode foil.

13. The polymer capacitor according to claim 12, wherein the at least one of the additives comprises a short or middle chain alkyl alcohol, a low molecular weight ester, an ethyl acetate or propyl acetate.

14. The polymer capacitor according to claim 12, wherein the at least one of the additives comprises a short or middle chain alkyl alcohol in form of a butyl alcohol.

15. The polymer capacitor according to claim 12, wherein the at least one of the additives comprises a short or middle chain alkyl alcohol in form of an isopropyl alcohol.

16. The polymer capacitor according to claim 12, wherein the at least one of the additives comprises a short or middle chain alkyl alcohol in form of an unsaturated alcohol.

17. The polymer capacitor according to claim 12, wherein the at least one of the additives comprises a low molecular weight ester having a molecular weight smaller than 200 g/mol.

18. The polymer capacitor according to claim 12, further comprising a liquid electrolyte.

19. The polymer capacitor according to claim 12, wherein the polymer is a solid polymer.

20. The polymer capacitor according to claim 12, wherein the polymer capacitor is free of water as a solvent.

* * * * *